United States Patent [19]

Peterson et al.

[11] 3,797,860

[45] Mar. 19, 1974

[54] MOBILE CARRIER FOR A RADIOACTIVE MATERIAL SHIPPING CONTAINER

[75] Inventors: Reuben W. Peterson, Brookmeade, Del.; Harold A. Backus, Wynwood, Pa.

[73] Assignee: NL Industries, Inc., New York, N.Y.

[22] Filed: May 24, 1971

[21] Appl. No.: 146,245

[52] U.S. Cl............................................ 280/179 R
[51] Int. Cl............................................... B60p 7/00
[58] Field of Search.......... 280/179 R, 143; 105/367

[56] References Cited
UNITED STATES PATENTS
2,331,416  10/1943  Muller ............................... 105/367
2,332,991  10/1943  Commire .......................... 280/143

Primary Examiner—Robert R. Song

[57] ABSTRACT

The mobile carrier includes a supporting framework having spaced support means connected to the framework for supporting opposite ends of the shipping container. The portions of the framework between said support means are placed in tension while the shipping container is placed in compression thereby substantially reducing the required weight and size of the supporting frame members.

6 Claims, 6 Drawing Figures

INVENTORS
HAROLD A. BACKUS
REUBEN W. PETERSON

BY

*Jay D. Gunn*
ATTORNEY

INVENTORS
HAROLD A. BACKUS
REUBEN W. PETERSON
BY
ATTORNEY

3,797,860

MOBILE CARRIER FOR A RADIOACTIVE MATERIAL SHIPPING CONTAINER

BACKGROUND OF THE INVENTION

The present invention relates to a mobile carrier for supporting a structure in shipping position, and more particularly for supporting a radioactive material shipping container adapted to ship spent fuel elements utilized in nuclear reactors and the like. Various types of radioactive material can be shipped in such containers and the containers are particularly suited for shipping irradiated nuclear fuel elements.

Shipping containers for radioactive material are generally mounted on trailers or railroad cars for shipment from one location to another. The present invention is directed to an improvement in the mobile support structure which may comprise a trailer, railroad car and the like, and is particularly directed to trailers for use in over-the-road transport of radioactive material shipping containers.

Transportation of relatively small spent fuel shipping containers by tractor trailer assemblies is considerably more economical than transportation of relatively large shipping containers by rail. It is necessary to meet highway gross vehicle weight limitations and this requires minimum tractor and trailer weights. In the past, such shipping containers have been supported on standard trailers as a dead weight more or less in the center of the trailer thereby creating maximum bending moments and requiring structural beams of considerable size and weight. The structural members in a trailer are usually quite heavy since they are designed for placement of many types of loads in many different positions thereon.

It is accordingly a principal objective of the present invention to provide a construction wherein the weight of the mobile carrier can be substantially reduced while at the same time providing adequate structural strength to carry the necessary loads.

SUMMARY OF THE INVENTION

The present invention employs the concept of carrying the shipping container on the mobile carrier in such a manner as to cause it to contribute to the overall strength of the carrier. A pair of spaced support means are provided on the supporting framework of the carriers for supporting the container in shipping position. When the container is mounted on the spaced support means, the portion of the framework between the support means is placed in tension while the container is placed in compression. The container is of rugged construction and is well adapted to take the compression load applied thereto.

By placing the portion of the framework between the support means in tension, the bending moments on the structural beams of the mobile carrier are substantially reduced thereby enabling a considerable reduction in beam size and weight to be achieved. This results in a reduced gross weight of the mobile carrier and supported shipping container for transport over highways without reducing the capacity and size of the shipping container.

The shipping containers employed for shipping spent fuel elements are generally of elongated configuration and are loaded in a top-end-up position and then transported in a generally horizontal attitude. It is accordingly necessary to provide a construction which enables the container to lay down when being lowered by a crane and the container comes into contact with the mobile carrier. This is accomplished in the present invention by providing a novel pair of spaced supports on the mobile carrier which engage slots formed on the container to cause the container to automatically move into proper shipping position when it is lowered into place on the mobile carrier. With this construction, the container can be readily loaded onto and removed from the mobile carrier when desired. At the same time, these novel supports place the container in compression and the structural beams of the carrier in compression.

DESCRIPTION OF THE PREFERRED EMBODIMENTS

Figure 1:
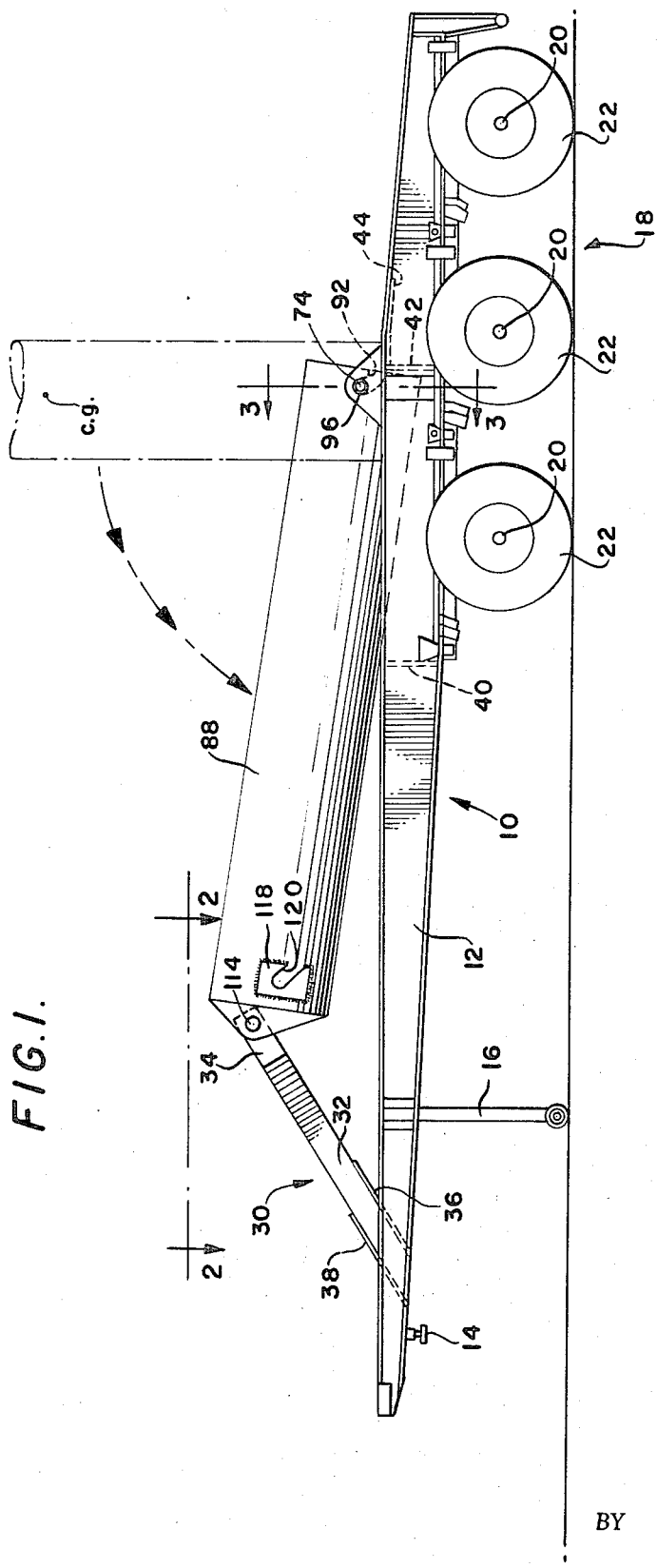
FIG. 1 is a side elevation of a first form of the invention illustrating a shipping container mounted in operative position upon a trailer.
Figure 2:
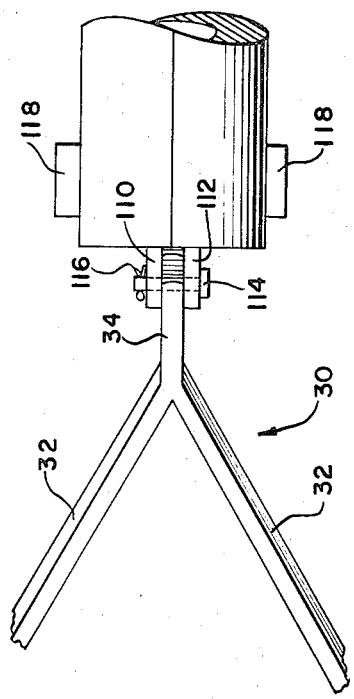
FIG. 2 is a view on an enlarged scale taken substantially along line 2—2 of FIG. 1 looking in the direction of the arrows.
Figure 3:
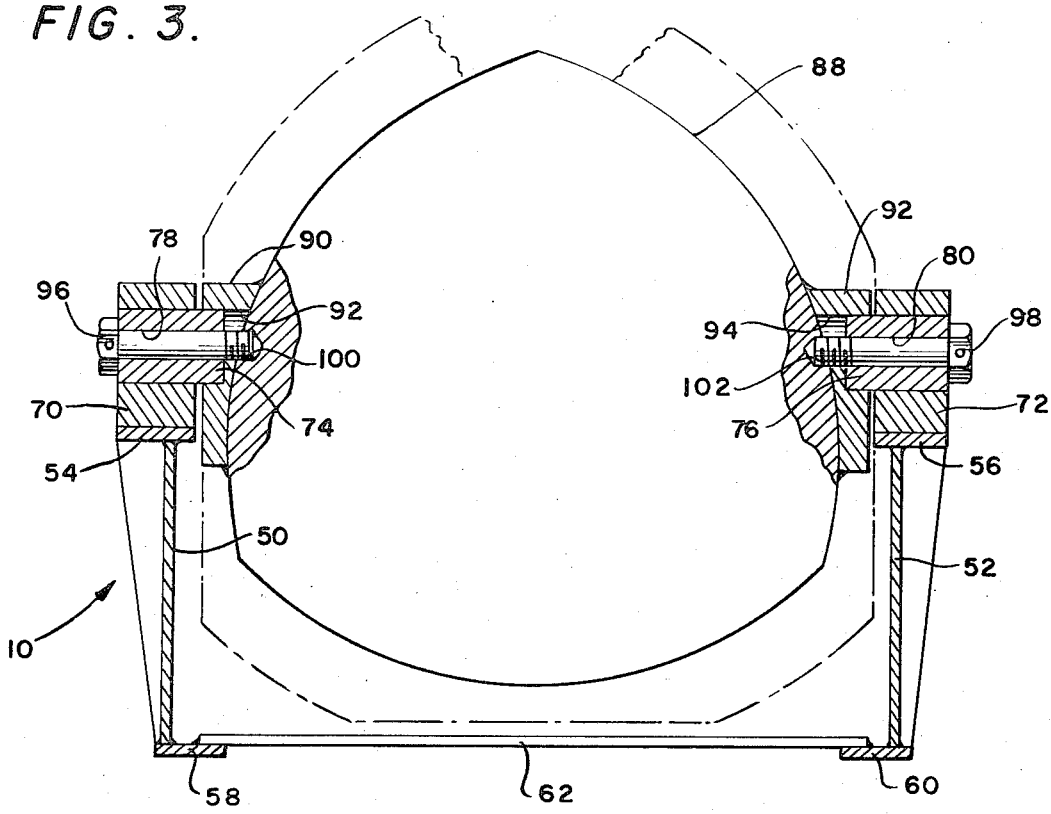
FIG. 3 is a sectional view on an enlarged scale taken substantially along line 3—3 of FIG. 1 looking in the direction of the arrows.

Reffering now to the drawings wherein like reference characters designate corresponding parts throughout the several views, a first form of the invention is illustrated in FIGS. 1–3, inclusive. The mobile carrier in this form of the invention comprises a trailer 10 including a rigid supporting framework 12 having the usual king pin 14 mounted at the forward end thereof for connection with the fifth wheel of a conventional tractor. The trailer is provided with conventional front parking wheels 16 and wheel assembly 18 is provided at the rear end of the trailer including three spaced axles 20 having pneumatically tired wheels 22 mounted thereon.

Spaced support means is provided on the framework for supporting a shipping container in shipping position, the spaced support means including a compression strut means indicated generally by reference numeral 30, this compression strut means being mounted adjacent the forward end of the trailer and being adapted to support one end of an associated shipping container. The compression strut means includes a pair of arms 32 the lower ends of which are secured to the trailer and which converge at the upper ends thereof and join with an attaching portion 34 adapted to be secured to a container as hereinafter described. Transversely extending plates 36 and 38 are interconnected with the lower ends of arms 32 and the framework of the trailer to reinforce the structure.

A pair of spaced plates 40 and 42 provide transverse bulkheads for the supporting framework adjacent the wheel assembly, and a generally horizontally disposed plate 44 is rigidly interconnected between the webs of the beams at opposite sides of the supporting framework to rigidify the overall construction.

Referring to FIG. 3, the opposite sides of the supporting framework include vertically extending webs 50 and 52 having generally horizontally disposed flanges 54 and 56 secured to the upper edges thereof. Further horizontally extending flanges 58 and 60 are secured to the lower edges of webs 50 and 52 to thereby provide generally Z-shaped beams at opposite sides of the supporting framework. A horizontal plate 62 is fixedly secured between flanges 58 and 60 to provide a bulkhead at the lower part of the framework.

The spaced support means on the framework includes a pair of supports for one end of the container including a pair of support members 70 and 72 fixedly secured to flanges 54 and 56 respectively of the supporting framework. Trunnion portions 74 and 76 are rigidly supported within suitable holes provided in support portions 70 and 72, the trunnions having coaxially extending bores 78 and 80 respectively formed therethrough.

A shipping container 88 for radioactive material may be of any suitable construction and includes members 90 and 92 secured to opposite portions of one end of the container, these members having curved slots 92 and 94 formed therein respectively which are adapted to receive trunnions 74 and 76. The upper closed ends of these curved slots are off center with respect to the center of gravity of the container such that when the container is lowered into position in a vertical direction as indicated in phantom lines in FIG. 1, the container will pivot about the trunnions and automatically lay down in a counterclockwise direction as seen in this figure so as to automatically move into the desired shipping position. It will be noted as seen in FIG. 1 that the center of gravity of the shipping container as indicated by reference character c.g. is offset to the left of a vertical plane passing through the trunnion portions.

After the shipping container has been moved into the shipping position, a pair of locking bolts 96 and 98 are inserted through the bores 78 and 80 formed in trunnions 74 and 76 respectively, the inner ends of these locking bolts being threaded within threaded holes 100 and 102 provided in the shipping container. This prevents the trunnions from backing out of the slots on upward g loading or extra heavy forward g loads applied to the structure.

As the shipping container is lowered into the shipping position shown in FIG. 1, the forward end of the container comes into contact with the upper end of attaching portion 34. A pair of spaced connecting ears 110 and 112 are fixed to this end of the container and have holes formed therethrough which are adapted to be aligned with a hole in attaching portion 34, a pin 114 being placed through the aligned holes and held in position by a cotter pin 116. A pair of lifting fittings 118 are provided at opposite sides of the container, each of these fittings having a slot 120 formed therein for receiving suitable pins provided on a lifting yoke.

It will be noted that the king pin 14 and the wheel assembly 18 provide spaced load carrying means which are normally operative when the trailer is being utilized for over-the-road transport of a shipping container. Support means 30 has the lower part thereof disposed substantially over the king pin, while the support means at the other end of the trailer in the form of trunnions 74 and 76 are disposed substantially over the wheel assembly. In this manner, the loads from the container are transmitted to points capable of carrying substantially greater loads.

Figure 4:
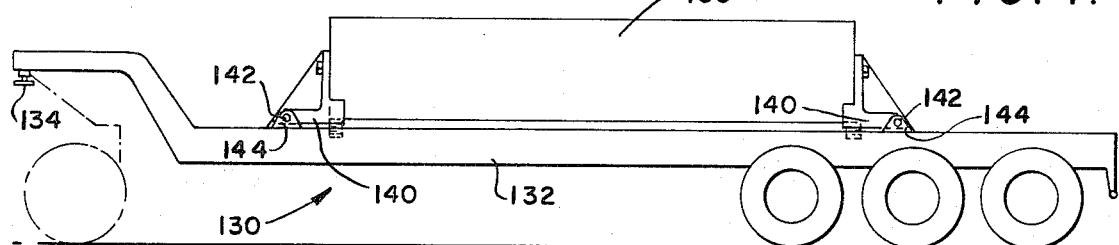
FIG. 4 is a side elevation of a modified form of the invention illustrating a shipping container mounted in shipping position thereon.
Figure 5:
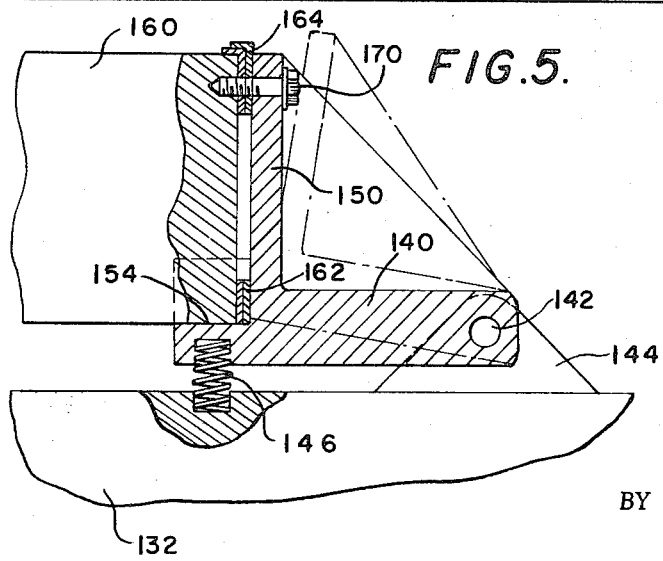
FIG. 5 is an enlarged sectional view of a portion of the structure shown in FIG. 4.
Figure 6:
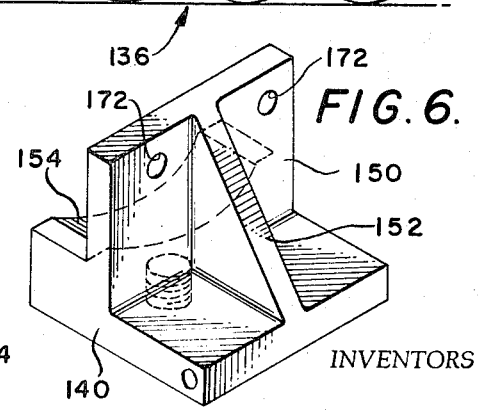
FIG. 6 is a top perspective view of a portion of the structure shown in FIG. 5.

Referring now to FIGS. 4–6 inclusive, a modified form of the invention is illustrated including a trailer indicated generally by reference numeral 130 and having a rigid supporting framework 132. A conventional king pin 134 is supported at the forward end of the trailer for cooperation with the fifth wheel of an associated tractor. A wheel assembly 136 is provided at the rear end of the trailer similar to the wheel assembly of the previously described embodiment of the invention.

The support means comprises a pair of spaced identical supports 140 disposed in facing relationship to one another. Each of these supports is mounted upon a pivot pin 142 supported by brackets 144 fixed to the framework of the trailer. Each of the supports is thereby mounted for pivotal movement with respect to the supporting framework and is normally biased in an upward direction by a compression spring 146 seated within suitable pockets in the framework and the associated support. The springs tend to open the supports into the phantom line position as shown in FIG. 5 so as to be in position for receiving a shipping container therebetween. The pivot pins 142 may comprise shear pins so as to limit the load carrying capacity of the support means.

Each support includes a vertically extending portion 150 connected with a gusset portion 152. A cradle portion 154 of suitable configuration is provided for receiving and supporting an end of an associated container.

A shipping container 160 is illustrated as being disposed in operative shipping position between the two supports. As seen in FIG. 5, a first plurality of shims 162 are provided between a lower part of one end of the container and the associated support, and a further plurality of shims 164 are provided between an upper part of the end of the container and the support. The number and size of shims employed may vary as required in order to securely hold the shipping container in the operative shipping position and to eliminate any gaps between the container and the supports.

Retainer means is provided for retaining the shipping container in the operative position illustrated and comprises a plurality of cap screws 170 which extend through suitable holes 172 provided in each of the supports, the inner threaded ends of the cap screws being threaded within threaded holes provided in the ends of the container.

In the modified form of the invention shown in FIGS. 4–6, the portion of the framework between the supports at opposite ends of the shipping container is again placed in tension while the container is placed in compression so as to reduce the required size and weight of the components of the framework of the mobile carrier.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. In combination, a mobile carrier including a supporting framework, spaced support means connected to said framework, said support means arranged to support a shipping container in shipping position between said spaced support means so as to place a portion of the supporting framework between said support means in tension, and connecting means at opposite extremities, respectively, of said shipping container arranged to engage said spaced support means to place the shipping container in compression said connecting means at one extremity of the shipping container comprising ear means and the connecting means at the opposite extremity of the shipping container comprising curved slot means arranged on opposite sides, respectively, of said shipping container.

2. Apparatus as defined in claim 1, wherein one of said spaced support means includes a compression strut connected to the ear means at the corresponding extremity of said shipping container.

3. Apparatus as defined in claim 1, wherein one of said support means of said framework includes a pair of trunnions constructed and arranged to engage at the curved slots in opposite sides respectively of said shipping container.

4. Apparatus as defined in claim 3 including locking means arranged to retain said trunnions in operative position in the curved slots of said shipping container.

5. Apparatus as defined in claim 4 wherein said locking means comprises a pair of locking bolts each of which extends through one of said trunnions.

6. Apparatus as defined in claim 5 wherein each of said locking bolts extends into a hole formed in said shipping container in axial alignment with its respective trunnion.

* * * * *